July 25, 1950 W. REITER ET AL 2,516,646
WAGON HITCH FOR HAY BALERS
Filed Nov. 10, 1949
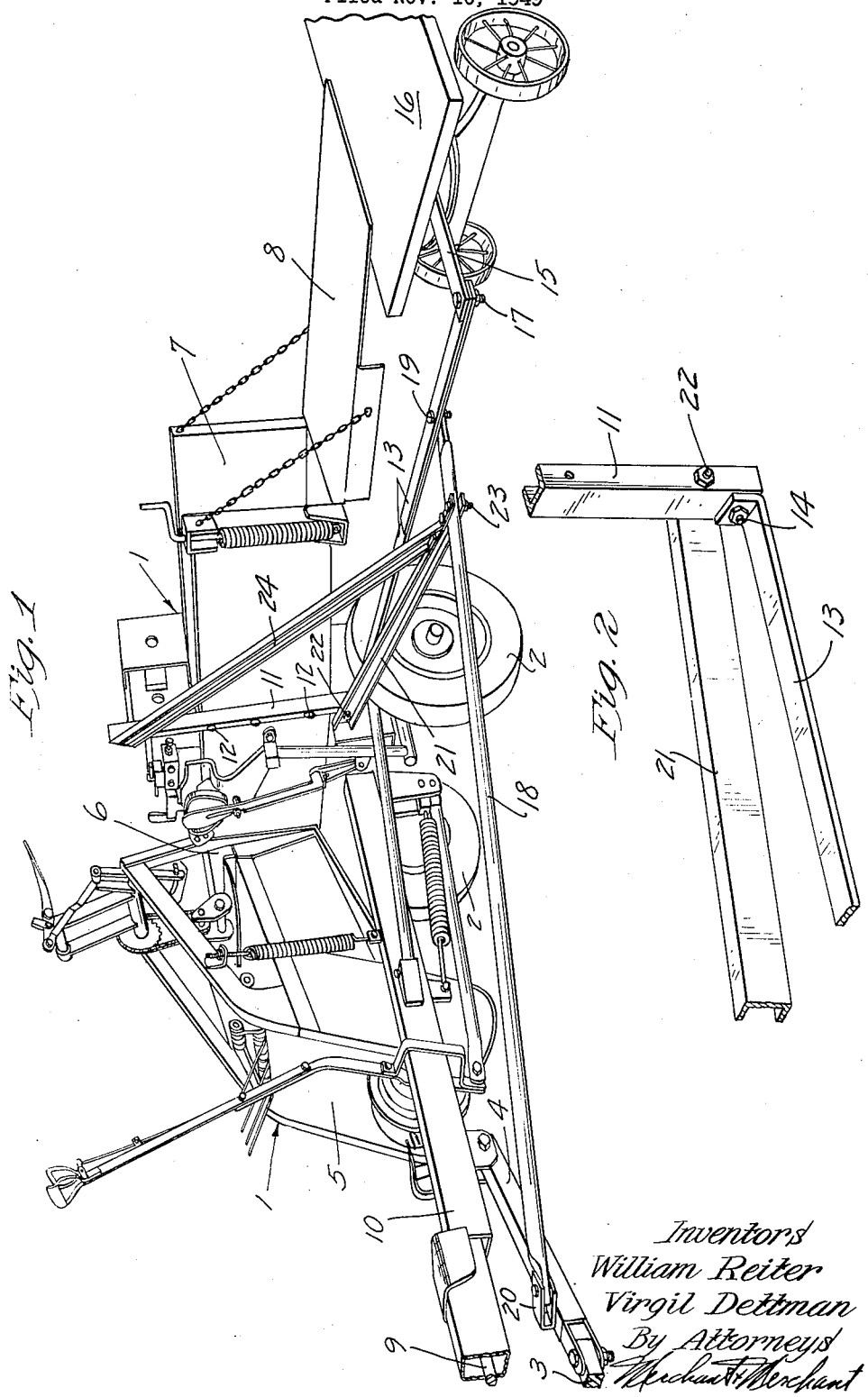
Inventors
William Reiter
Virgil Dettman
By Attorneys
Merchant & Merchant Patented July 25, 1950

2,516,646

UNITED STATES PATENT OFFICE 2,516,646

WAGON HITCH FOR HAY BALERS

William Reiter and Virgil Dettman, Hutchinson, Minn.

Application November 10, 1949, Serial No. 126,508

2 Claims. (Cl. 280—33.44)

Our invention relates generally to means for hitching a wagon to harvesting equipment and, more specifically, to means for hitching a wagon to a mobile hay baler or the like.

Heretofore, it has been customary to permit bales of hay to be discharged onto the ground by the baler to be picked up later and loaded onto a wagon or truck for hauling to storage. In some instances, a wagon or truck is driven alongside the baler to directly receive the bales discharged therefrom. This practice generally requires an extra man to operate the receiving vehicle in addition to the loader of the vehicle.

The primary object of our invention is, therefore, the provision of a wagon hitch which may be mounted on a mobile hay baler and to which a bale-receiving vehicle may be hitched so as to be drawn by the baler in its travel through a field.

Another object of our invention is the provision of a wagon hitch as set forth which will position a receiving vehicle at the discharge end of a baler discharging bales transversely of the direction of travel of the baler.

Another object of our invention is the provision of a wagon hitch as set forth which is simple and inexpensive to build and install, rugged in construction, and efficient and durable in use.

Other highly important objects and advantages of our invention will become apparent from the following detailed specification, appended claims, and attached drawings.

Referring to the drawings, wherein like characters indicate like parts throughout the several views:

Fig. 1 is a view in perspective of a wagon hitch built in accordance with our invention and mounted on a hay baler, some parts being broken away; and Fig. 2 is a fragmentary view in perspective of a portion of our device detached from the baler and seen from the right to the left with respect to Fig. 1.

Referring with greater particularity to the drawings, the numeral 1 indicates, in its entirety, a conventional hay baler mechanism supported on ground wheels 2 and adapted to be detachably secured to the drawbar 3 of a tractor not shown by means of a tongue or the like 4. The baler comprises a hay inlet 5, baling mechanism not shown but contained within a baling chamber 6, a discharge chute or the like 7, and a discharge ramp 8. The baler mechanism is adapted to be driven from the power take-off of the tractor by a drive shaft 9 contained within a housing 10.

Our novel wagon hitch comprises a generally vertical beam 11 secured to the baler 1 by bolts or the like 12. The beam 11 is located at the discharge side of the baler 1 and is preferably made from a length of structural channel or the like. An elongated hitch member 13 has its inner end rigidly secured to the lower end of the beam 11, as indicated at 14, and extends laterally outwardly therefrom forward of the discharge chute 7. At its outer free end, the hitch member 13 is adapted to be connected to the tongue 15 of a wheeled vehicle, such as a wagon or the like 16, by means of a nut-equipped bolt or the like 17. A tie member 18 has its rear end secured to the hitch member 13 intermediate its ends by a bolt or the like 19 and extends angularly forwardly therefrom, the forward end thereof being secured to a clevis 20 fast on the tongue 4 of the baler 1. A generally horizontal brace member 21, preferably made from structural channel, is secured at its opposite ends to the lower end portion of the beam 11 by a nut-equipped bolt 22 and to the tie member 18 by a nut-equipped bolt 23. It will be noted that the outer end of the brace member 21 is bifurcated to receive the engaged portion of the tie member 18 therein, and that the point of engagement between the brace member 21 and the tie member 18 is located in forwardly-spaced relation to the rear end of the tie member 18. A diagonally-disposed brace member has its upper end welded or otherwise secured to the upper end portion of the beam 11 and its lower end to the outer end portion of the brace member 21. The diagonal brace member 24 supports the outer end of the brace member 21, the tie member 18, and the hitch member 13 in a substantially horizontal position at substantially the normal level of the wagon tongue 15. The greater part of the load exerted by the wagon upon the hitch member 13 is transferred to the tongue 4 by the tie member 18.

From the above, it will be seen that, as the baler 1 and wagon 16 are moved through a field, bales will be discharged onto the wagon 16 from the discharge chute 7 and that an appreciable amount of man power is conserved in that there need be no driver for the wagon 16. When the wagon tongue 15 is disengaged from the hitch member 13, the diagonal brace member 24 supports the tie member 18 and the hitch member 13 in a generally horizontal position upwardly spaced from the ground so that the same does not interfere with further movement of the baler 1 through a field or the like.

Our invention has been thoroughly tested and found to be adequate for the accomplishment of the objectives set forth; and, while we have shown a commercial embodiment of our novel device, it will be understood that the same is capable of modification within the spirit and scope of the invention as defined in the claims.

What we claim is:

1. A wagon hitch for mobile hay balers having means for discharging bales transversely of the direction of travel of the baling mechanism, said wagon hitch comprising a vertical beam adapted to be rigidly secured to the baler, a hitch member extending laterally outwardly from the lower end of said beam and terminating forwardly and laterally outwardly of the discharge opening of said bailer, an angularly-disposed substantially horizontal tie member having its front and rear ends secured respectively to the front end portion of the baler and the intermediate portion of said hitch member, a generally horizontal brace member interconnecting the lower end portion of said beam and the tie member forwardly of the rear end of said tie member, and a supporting member extending diagonally between the upper end of said beam and the outer end of said brace member whereby to support said hitch member and said tie member in a generally horizontal plane.

2. In combination with a baler having a discharge opening for discharging bales laterally outwardly with respect to the direction of travel of the baler, a wagon hitch comprising a vertical beam rigidly secured to the baler, a hitch member extending laterally outwardly from the lower end of said beam and terminating forwardly and laterally outwardly of the discharge opening of said baler, an angularly-disposed substantially horizontal tie member having its front and rear ends secured respectively to the front end portion of the baler and the intermediate portion of said hitch member, a generally horizontal brace member interconnecting the lower end portion of said beam and the tie member forwardly of the rear end thereof, and a supporting member extending diagonally between the upper end of said beam and the outer end of said brace member whereby to support said hitch member and said tie member in a generally horizontal plane.

WILLIAM REITER.
VIRGIL DETTMAN.

REFERENCES CITED

The following references are of record in the file of this patent:

UNITED STATES PATENTS

| Number | Name | Date |
|---|---|---|
| 1,708,922 | Loots et al. | Apr. 9, 1929 |
| 1,941,670 | Everett | Jan. 2, 1934 |
| 1,941,821 | Baker | Jan. 2, 1934 |